United States Patent
Rome et al.

(10) Patent No.: US 6,192,901 B1
(45) Date of Patent: Feb. 27, 2001

(54) AIR INTAKE CLEANER SYSTEM

(75) Inventors: John A. Rome; Eduardo Betancourt, both of Santa Ana, CA (US)

(73) Assignee: Motorvac Technologies, Inc., Santa Ana, CA (US)

( * ) Notice: Subject to any disclaimer, the term of this patent is extended or adjusted under 35 U.S.C. 154(b) by 0 days.

(21) Appl. No.: 09/209,508

(22) Filed: Dec. 10, 1998

(51) Int. Cl.$^7$ .................................................. B08B 3/02
(52) U.S. Cl. ................................. 134/102.2; 134/166 R; 134/169 A; 123/198 A
(58) Field of Search .................... 123/198 A; 134/166 R, 134/169 A, 102.2, 166 C, 168 C, 169 C

(56) References Cited

U.S. PATENT DOCUMENTS

| | | | |
|---|---|---|---|
| 2,076,262 | 4/1937 | Black | 134/1.5 |
| 2,632,719 | 3/1953 | Tankersley | 134/24 |
| 2,704,058 | * 3/1955 | Case . | |
| 2,922,407 | * 1/1960 | Lee . | |
| 3,188,238 | 6/1965 | Lyon | 134/24 |
| 3,281,269 | 10/1966 | Watts | 134/22 |
| 4,059,123 | 11/1977 | Bartos et al. | 134/102 |
| 4,323,266 | 4/1982 | Savage | 280/707 |
| 4,364,370 | * 12/1982 | Smith et al. . | |
| 4,429,432 | 2/1984 | Copeland et al. | 15/320 |
| 4,494,487 | * 1/1985 | Nixon . | |
| 4,703,728 | * 11/1987 | Payne et al. . | |
| 4,776,766 | 10/1988 | Brent | 417/44 |
| 4,801,088 | 1/1989 | Baker | 239/152 |
| 4,807,578 | * 2/1989 | Adams et al. . | |
| 4,865,059 | 9/1989 | Leleve | 134/56 R |
| 4,989,561 | * 2/1991 | Hein et al. . | |
| 5,097,806 | * 3/1992 | Vataru et al. . | |
| 5,452,696 | * 9/1995 | Flynn . | |
| 5,503,683 | * 4/1996 | Butcher et al. . | |
| 5,826,602 | * 10/1998 | Chen . | |
| 5,845,225 | * 12/1998 | Mosher . | |
| 5,887,606 | * 3/1999 | Tsou . | |

OTHER PUBLICATIONS

Wynn's Fuel System Tune–up (F.S.T.) Service, Operating Procedures Manual, 1997; 16 pgs.
MAC Tools, EMC 1000 Emissions Management Center, May 1998; 28 pgs.
International Search Report, mailed Mar. 7, 2000; 4 pgs.

* cited by examiner

Primary Examiner—Frankie L. Stinson
(74) Attorney, Agent, or Firm—Lyon & Lyon LLP

(57) ABSTRACT

System for cleaning and decarbonizing a vehicle's air intake manifold, the system comprising a power source, such as the vehicle's battery, a housing that includes an air compressor coupled to the power source, a fluid tank connected to the air compressor, a spray nozzle connected to the fluid tank, a fluid container, a regulator, and a solenoid valve interposed between the solenoid valve and the regulator, the solenoid valve further being coupled to the power source.

12 Claims, 3 Drawing Sheets

AIR INTAKE CLEANER SYSTEM

BACKGROUND OF THE INVENTION

The present invention relates generally to vehicular maintenance and, more particularly, to systems for cleaning a vehicle's air intake manifold.

In the past several years, substantial attention has been directed to servicing vehicles on location and, thus, eliminating the need for moving, or in some instances towing, vehicles to mechanic shops for repairs and/or services.

One area of vehicular maintenance concerns the de-carbonizing and cleaning of vehicles' air intake manifold, including the combustion chambers, exhaust systems, air intake system, intake valves and fuel systems. To perform these services, with the engine off, cleaner detergent is sprayed into the throttle intake, thus cleaning and lubricating the intake runners, throttle plate and idle speed bypass valve. Also, with the engine idling, decarbonizer fluid is fed through a selected vehicle's vacuum port to clean and decarbonize the vehicle's air intake manifold, intake valves and combustion chambers. Such vehicular services create an improved fuel burn that in turn improves the vehicle's horsepower, increases fuel economy and reduces exhaust emissions.

The existing air intake cleaner systems, which may perform these cleaning processes, require the use of a mechanic-shop compressor for their operation. This requirement has many drawbacks. To discuss only a few, using the existing air intake cleaners, the cleaning processes may only be performed inside the mechanic shops. Because shop compressors are expensive and are used for many purposes, long waits for a compressor availability make using the present cleaner systems very time consuming. Furthermore, present systems require that long compression hoses run throughout the shop. Because of the limited length of these compression hoses, the present systems cannot be used outside of the shop area or on the shop parking areas.

Even more importantly, the existing systems lack versatility and may not be used to service vehicles on the road. Another element contributing to this lack of versatility is the existing systems' need for the 110-Volt power sources that may not be available on the road.

There is, therefore, an intense need within the industry to provide a versatile, less time consuming and improved air intake cleaner systems. In view of this necessity, it is believed that those skilled in the art would find the air intake cleaner systems of the present invention to be quite useful.

SUMMARY OF THE INVENTION

In a first separate aspect, the present invention is directed to an air intake cleaner system that comprises a power source, and a housing which includes an air compressor coupled to the power source, a fluid tank with fluid and connected to the air compressor via a first hose, and a spray nozzle connected to the fluid tank via a second hose. The compressor forces the air through the first hose into the fluid tank such that the fluid inside the tank is forced through the second hose to reach the spray nozzle.

In a second separate aspect, the power source of the first separate aspect may be the vehicle's battery.

In a third separate aspect, the system of the first separate aspect may also include a relief valve and a check valve interposed onto the first hose and between the compressor and the fluid tank.

In a fourth separate aspect, the present invention is directed to a system for servicing a vehicle having a power source. The system comprises an air compressor coupled to the power source, a fluid tank with fluid and connected to the air compressor via a first hose, and a spray nozzle connected to the fluid tank via a second hose. The compressor forces the air through the first hose into the fluid tank such that the fluid inside the tank is forced through the second hose to reach the spray nozzle.

In a fifth separate aspect, the system of the fourth separate aspect may also include a relief valve and a check valve interposed onto the first hose and between the compressor and the fluid tank.

In a sixth separate aspect, the present invention is directed to a system for servicing a vehicle having a power source. The system comprises a fluid container with fluid and connected to a first hose, a regulator connected to the first hose at one end and a second hose at the other end, and a solenoid valve connected to the first hose and interposed between the fluid container and the regulator, the solenoid valve is also coupled to the power source. The air is vacuumed from the second hose through the regulator to the first hose and the solenoid valve such that a mixture of the fluid and air flows through the first hose and out of the second hose.

In a seventh separate aspect, the power source of the sixth separate aspect may be the vehicle's battery.

In an eighth separate aspect, the system of the sixth separate aspect may also include an opener device for receiving and opening the fluid container.

Accordingly, it is an object of the present invention to provide systems for cleaning air intake manifold of vehicles.

Other objects and features of the present invention will become apparent from consideration of the following description taken in conjunction with the accompanying drawings.

DETAILED DESCRIPTION OF PREFERRED EMBODIMENTS

Figure 1:
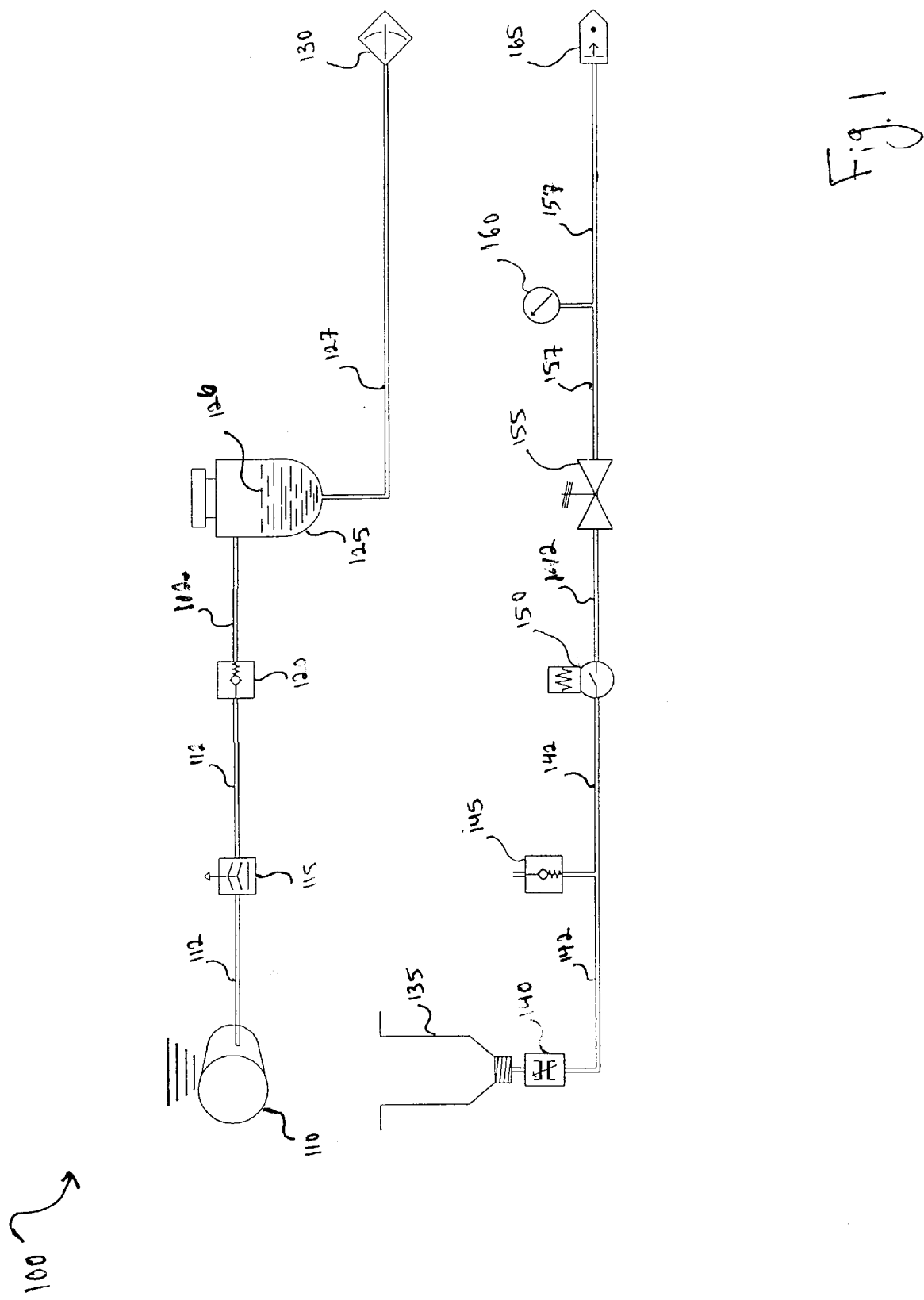
FIG. 1 is a diagram of an air intake cleaner system.

Turning now to the drawings, FIG. 1 is a schematic illustration of an air intake cleaner system 100 according to a preferred embodiment of the present invention. As shown, the system 100 includes an internal air compressor 110, a compressor hose 112, a relief valve 115, a first check valve 120, a detergent tank 125, a spray hose 127, a spray nozzle 130, a bottle receptacle 135, a bottle seal opener device 140, a fluid hose 142, a second check valve 145, a solenoid valve 150, a regulator 155, a vacuum gauge 160, a vacuum hose 157 and a connection adapter 165. The cleaner system 100 also includes an electrical system 200 and a control housing 300 as shown in FIGS. 2 and 3, respectively.

Figure 2:
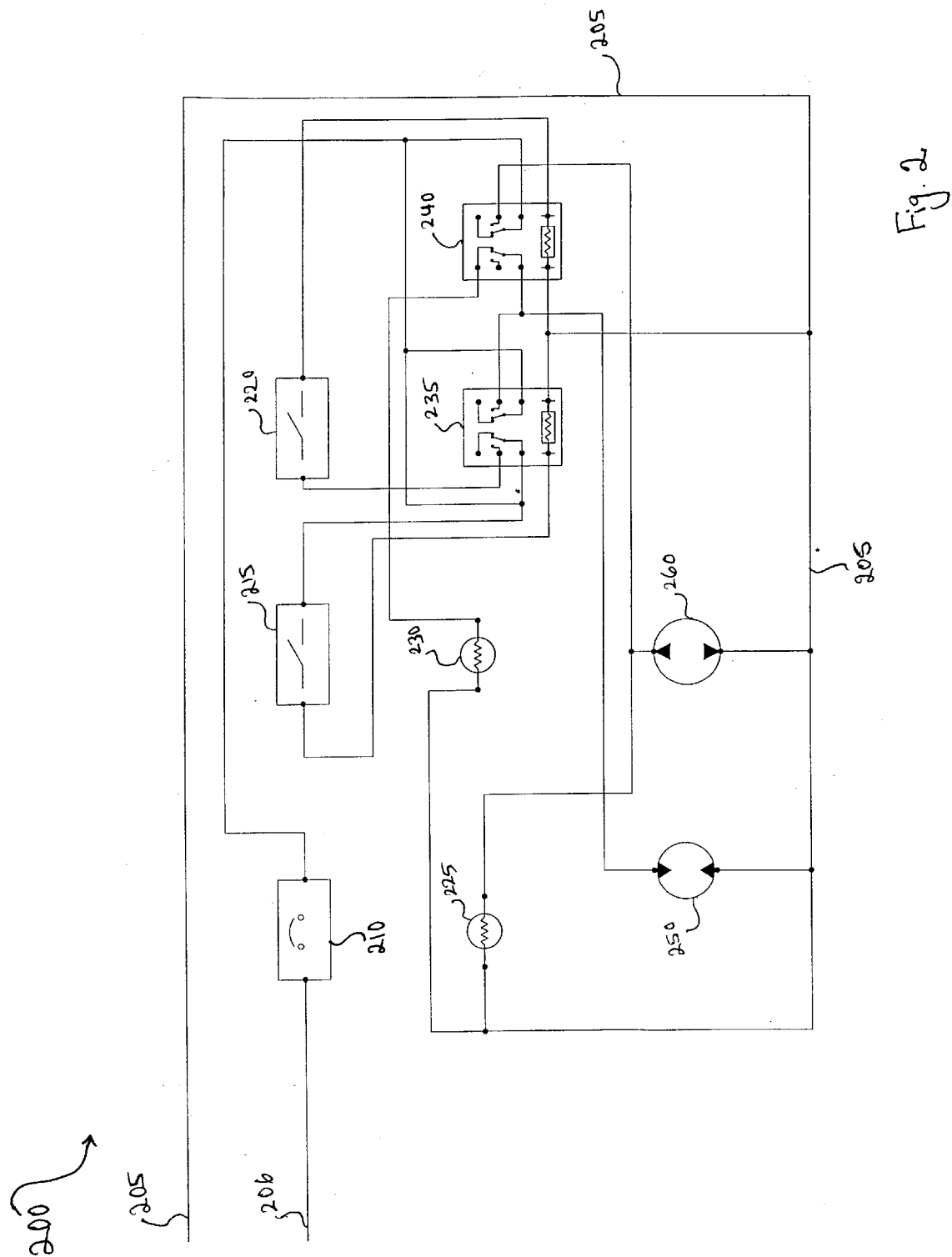
FIG. 2 is a diagram of an electrical system for the air intake cleaner system of FIG. 1.

As shown in FIG. 2, the electrical system 200 of the cleaner system 100 includes a negative current line 205, a positive current line 206, a fuse connector 210, a limit switch 215, an on/off switch 220, a run light connector 225, a power light connector 230, a first relay 235, a second relay 240, a solenoid switch 250 and a compressor switch 260.

Figure 3:
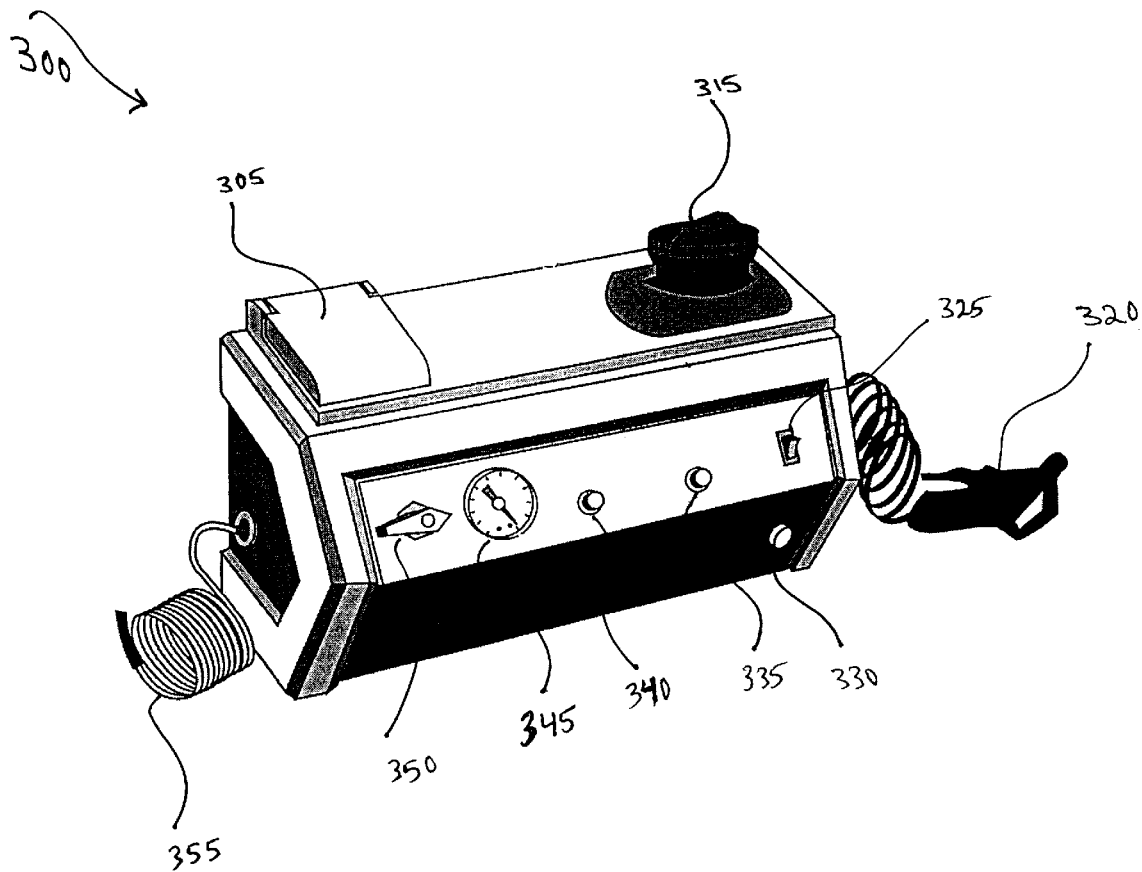
FIG. 3 is a pictorial view of a housing for the air intake cleaner system of FIG. 1.

Also, as illustrated in FIG. 3, the control housing 300 is shown to include an engine decarbonizer receptacle 305, positive and negative battery leads (not shown), an intake cleaner receptacle 315, a cleaner applicator 320, an on/off control 325, a fuse 330, a run light 335, a power light 340, a vacuum gauge 345, a flow control valve and an engine decarbonizer hose 355.

Using the cleaner system 100 to service a vehicle's air and fuel induction system, the vehicle should first be started and allowed to run for a few minutes so it reaches a normal operating temperature. To start the service, the regulator 155 should be closed. To this end, the flow control valve 350 is turned clockwise until the regulator 155 is completely closed.

In the next step, the engine decarbonizer receptacle 305 is opened and a bottle (not shown) containing engine decarbonizer detergent is inserted into the bottle receptacle 135. The bottle is turned upside down and is threaded into the bottle receptacle 135. Threading the bottle in place causes the bottle seal opener device 140 to come in contact with a thin aluminum (not shown) which covers the bottle opening. The bottle seal opener device 140 may be a piercing point that ruptures or pierces through the thin aluminum cover. In this way, the engine decarbonizer detergent may flow down into the detergent hose 142 once the flow control valve 350 is turned open and air is allowed to come in. The check valve 145 is also inserted onto the detergent hose 142 to assure that no detergent fluid passes through the check valve 142 toward the regulator 155 unless air is flowing into the detergent hose 142.

Next, a non-ported vacuum port on the air intake manifold closest to the throttle plate of the vehicle should be selected. The vehicle's vacuum hose (not shown) should be disconnected, and in place thereof, the engine decarbonizer hose 355 should be connected onto the selected vehicle's vacuum port. Internally, the engine decarbonizer hose 355 is connected to the vacuum hose 157 via the connection adapter 165. Once the vehicle's engine is started, air starts to be sucked into the vacuum hose 157 and the vacuum gauge 160 displays the air pressure. Because the regulator 155 is closed, the air is not permitted to flow beyond the regulator 155. Turning the flow control valve 350 opens the regulator 155 and allows the incoming air to flow through the solenoid hose 152 to the solenoid valve 150.

In its default position, the solenoid valve 150 is in closed position. The solenoid valve 150 is controlled via the solenoid switch 250, as shown in FIG. 2. The electrical system 200 causes the solenoid switch 250 to open the solenoid valve 150 when the cleaner system 100 is connected to electrical power and the limit switch 215 indicates that the detergent bottle is in place. To connect the cleaner system 100 to power, the battery leads (not shown) of the system 100 are connected to the vehicle's battery. The positive battery lead is connected to the positive battery terminal and the negative battery lead is connected to the negative battery terminal of the vehicle.

Assuming that all conditions are met, the air is vacuumed or sucked through the solenoid valve 150, the detergent hose 142 and the check valve 145. As a result, a mixture of air and detergent fluid flows out of the engine decarbonizer hose 355 into the air intake of the vehicle. During this process, the vacuum gauge 160 may be monitored and the flow control valve 350 may be turned to control the regulator 155 and the amount of air going into the system 100. Once the detergent fluid is depleted, the flow control valve 350 should be turned to close the regulator 155. The vehicle's engine should be shut off and the engine decarbonizer hose 355 should be disconnected from the vehicle's selected vacuum port. To end the process, the vehicle's hose should be reconnected to the selected vacuum port.

To continue servicing the vehicle's air and induction system, the air intake duct hose (not shown) is removed from the throttle plate opening of the vehicle. To further prepare the vehicle for service, the throttle plate is opened.

At this point, the detergent tank 125 is filled with detergent fluid 126. The cleaner system 100 is connected to the vehicle's battery via the battery leads (not shown). The positive battery lead is connected to the positive battery terminal and the negative battery lead is connected to the negative battery terminal of the vehicle. Once the on/off switch 325 is pressed, the air compressor 110 starts pumping air through the compressor hose 112, the relief valve 115 and the check valve 120 into the detergent tank 125. The compressed air in the detergent tank 125 places pressure on the fluid 126 and causes the fluid 126 to flow out of the detergent tank 125 and into the spray hose 127. From there, the spray nozzle 130 controls the flow of the fluid 126. The spray nozzle 130 is located in the cleaner applicator 320, as shown in FIG. 3.

The relief valve 115 is interposed in the fluid path and onto the compressor hose 112 to assure that excess air pressure is released from the system 100. In the preferred embodiment, the relief valve 115 is designed such that excess pressure over twenty (20) psi is released from the system 100. The check valve 120 is also interposed onto the fluid path and onto the compressor hose 112 to prevent fluid 126 from going backward to the relief valve 115 and the air compressor 110. The check valve 120 further retains air pressure in the detergent tank 125.

In the next step, the spray nozzle 130 is directed toward the vehicle's throttle plate and the throttle bore area. The detergent fluid 126 is sprayed into those areas. Next, the throttle plate should be closed and the vehicle's engine should be started. The spray nozzle 130 should be directed toward the throttle bore and the idle-air bypass areas of the vehicle and short bursts of the fluid should be sprayed into those areas. As the last step of the process, the vehicle's engine should be turned off and the air intake duct hose (not shown) should be reconnected.

Turning to FIG. 2, the negative line 205, which is connected to the vehicle's negative battery terminal, runs throughout the electrical system 200 to provide the ground level. The positive line 206, which is connected to the vehicle's positive battery terminal, runs throughout the electrical system 200 to provide the positive level.

When the electrical system 200 receives electrical power, the power light connector 230 is energized causing the power light 340 to turn on. The first relay 235 is activated when both the limit switch 215 and the on/off switch 220 are closed. The limit switch 215 closes when the detergent bottle (not shown) is properly inserted into the bottle receptacle 135 such that bottle seal opener device pierces through the aluminum cover of the bottle. The on/off switch 225 closes when the on/off switch is thrown in the on position.

The second relay 240, on the other hand, is activated when the on/off switch 220 is closed or is in on position. In such case, the air compressor starts pumping air through the compressor hose 112 and the run light connector 225 activates the run light 335 and the power light connector 230 deactivates the power light 340.

The circuit breaker fuse 210 is interposed onto the positive line 206 to protect the electrical system 200 against possible power surges.

While the present invention is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. An engine decarbonization system for servicing a vehicle having a power source and an engine, said system comprising:

a fluid container having fluid and connected to a first hose;

a regulator connected to said first hose at one end and a second hose at the other end; and a solenoid valve connected to said first hose and interposed between said fluid container and said regulator, said solenoid valve further being coupled to said power source;

wherein the second hose is connectable to a vacuum port of the engine at one end such that, when the second hose is connected to the vacuum port and the engine is activated, air is vacuumed through the second hose, the regulator, the solenoid valve, and the first hose, causing a mixture of the fluid and air to flow through the first hose and out of the second hose into the vehicle.

2. The system of claim 1, wherein said power source is a battery.

3. The system of claim 1 further comprises an opener device for receiving and opening said fluid container.

4. The system of claim 1 further comprising a check valve connected to said first hose and interposed between said fluid container and said regulator.

5. The system of claim 1 further comprising a pressure gauge connected to said second hose.

6. A system for servicing an engine, the system comprising:

a housing;

a power source;

an engine decarbonization system comprising:

a detergent receptacle for holding engine decarbonizer detergent;

an engine decarbonization hose in fluid communication with the detergent receptacle, the engine decarbonizer hose being connectable at one end to a vacuum port of the engine; and an air intake cleaning system comprising:

an air compressor located within the housing and coupled to the power supply;

an air intake detergent tank held within the housing;

a first hose connecting said air compressor to said air intake detergent tank; and a second hose connecting said air intake detergent tank to a spray nozzle.

7. A system for servicing an engine according to claim 6, the engine decarbonization system further comprising a detergent hose located between the detergent receptacle and the engine decarbonization hose.

8. A system for servicing an engine according to claim 1, the engine decarbonization system further comprising a check valve located in the detergent hose upstream of the detergent receptacle.

9. A system for servicing an engine according to claim 8, the engine decarbonization system further comprising a solenoid valve located in the detergent hose, the solenoid valve located upstream of the check valve.

10. A system for servicing an engine according to claim 8, the engine decarbonization system further comprising a regulator located in the detergent hose upstream of the check valve, the regulator being controlled by a flow control valve disposed on the housing.

11. A system for servicing an engine according to claim 10, the engine decarbonization system further comprising a vacuum gage located in the detergent hose upstream of the regulator.

12. A system for servicing an engine according to claim 6, the engine decarbonization system further comprising a bottle seal opener device located in the detergent receptacle.

* * * * *